United States Patent
Milosiu et al.

(10) Patent No.: US 11,044,127 B2
(45) Date of Patent: Jun. 22, 2021

(54) DATA TRANSMITTER MODIFYING A STANDARD-BASED RADIO SIGNAL

(71) Applicant: Fraunhofer-Gesellschaft zur Förderung der angewandten Forschung e.V., Munich (DE)

(72) Inventors: Heinrich Milosiu, Erlangen (DE); Frank Oehler, Adelsdorf (DE); Tobias Dräger, Baiersdorf (DE)

(73) Assignee: Fraunhofer-GeseHschaft zur Förderung der angewandten Forschung e.V.

( * ) Notice: Subject to any disclaimer, the term of this patent is extended or adjusted under 35 U.S.C. 154(b) by 0 days.

(21) Appl. No.: 15/217,069

(22) Filed: Jul. 22, 2016

(65) Prior Publication Data
US 2017/0026208 A1   Jan. 26, 2017

(30) Foreign Application Priority Data
Jul. 23, 2015   (DE) ..................... 10 2015 213 977.8

(51) Int. Cl.
*H04L 27/04*   (2006.01)
*H04B 1/04*    (2006.01)
*H04B 1/16*    (2006.01)
*H04L 27/06*   (2006.01)
*H04W 52/02*   (2009.01)

(52) U.S. Cl.
CPC ............... *H04L 27/04* (2013.01); *H04B 1/04* (2013.01); *H04B 1/16* (2013.01); *H04L 27/06* (2013.01); *H04W 52/0229* (2013.01); *Y02D 30/70* (2020.08)

(58) Field of Classification Search
USPC ........................................... 375/300
See application file for complete search history.

(56) References Cited

U.S. PATENT DOCUMENTS 5,574,408 A * 11/1996 Zwack .................... H03L 1/026
                                                          331/158
6,993,084 B1 * 1/2006 Eberlein ............. H04L 27/2613
                                                          375/260
(Continued)

FOREIGN PATENT DOCUMENTS

EP    2680522 A1    1/2014
JP    2011217181 A  10/2011
(Continued)

OTHER PUBLICATIONS

Florin Hutu et al., "A new wake-up radio architecture for wireless sensor networks," EURAISIP Journal on Wireless Communications and Networking 2014, 2014:177; http://jwcn.eurasipjournals.com/content/2014/177 (10 pages).
(Continued)

*Primary Examiner* — Shuwang Liu
*Assistant Examiner* — Gina M McKie
(74) *Attorney, Agent, or Firm* — Haynes and Boone LLP

(57) ABSTRACT

Embodiments of the present invention provide a data transmitter for transmitting a radio signal, the data transmitter being configured to modify a standard-based radio signal in order to transmit a modified radio signal, the amplitude of which, in a frequency band, additionally has a bit sequence.

22 Claims, 8 Drawing Sheets

(56) References Cited

U.S. PATENT DOCUMENTS

| | | | |
|---|---|---|---|
| 2006/0154626 A1* | 7/2006 | Maerzinger | H03G 3/3047 455/127.1 |
| 2007/0253468 A1* | 11/2007 | Pettersen | H04B 1/0483 375/146 |
| 2009/0077404 A1* | 3/2009 | Herring | G06F 1/3237 713/323 |
| 2009/0124301 A1* | 5/2009 | Raissinia | H04W 52/0216 455/574 |
| 2013/0208831 A1* | 8/2013 | Oehler | H04W 52/0229 375/316 |
| 2014/0119410 A1 | 5/2014 | Tian et al. | |
| 2014/0369170 A1* | 12/2014 | Inha | H04M 1/7253 367/140 |
| 2015/0172423 A1 | 6/2015 | Wu et al. | |
| 2016/0278013 A1* | 9/2016 | Shellhammer | H04W 52/0225 |

FOREIGN PATENT DOCUMENTS

| | | |
|---|---|---|
| WO | WO2009078575 A1 | 6/2009 |
| WO | WO 2014132469 A1 | 9/2014 |

OTHER PUBLICATIONS

Office Action dated Oct. 2, 2017 issued in parallel Japanese patent application No. 2016-143810 (8 pages with English translation).

* cited by examiner

DATA TRANSMITTER MODIFYING A STANDARD-BASED RADIO SIGNAL

CROSS-REFERENCE TO RELATED APPLICATION

This application claims priority from German Patent Application No. 10 2015 213 977.8, which was filed Jul. 23, 2015, and is incorporated herein by reference in its entirety.

BACKGROUND OF THE INVENTION

Embodiments of the present invention relate to a data transmitter, and in particular to a data transmitter which modifies a standard-based radio signal in order to transmit additional information. Further embodiments relate to a wake-up pattern generator by means of standard radio systems.

A data receiver having an RF transceiver and an additional, energy-saving RF receiver is known, wherein the RF transceiver is disabled when there is no longer an active radio connection, thereby reducing the energy consumption of the data receiver. In order to recognize a connection-forming radio signal which is emitted by a data transmitter, although the RF transceiver is disabled, the frequency range used by the RF transceiver for transmitting and receiving radio signals is instead monitored by the energy-saving RF receiver, wherein the RF transceiver is enabled again responsive to recognizing the connection-forming radio signal.

Conventional standard-based data transmitters, however, are not suitable for emitting a connection-forming radio signal which may be recognized by the energy-saving RF receiver.

The object underlying the present invention is providing a concept of making standard-based data transmitters compatible with the data receiver as described above.

SUMMARY

An embodiment may have a data transmitter for transmitting a radio signal, the data transmitter being configured to modify a standard-based radio signal in order to transmit a modified radio signal, the amplitude of which, in a frequency band, additionally has a bit sequence.

According to another embodiment, a system may have: a data transmitter as mentioned Above; and a data receiver, the data receiver having an RF transceiver and an additional RF receiver; wherein the RF transceiver is configured to transmit and receive standard-based radio signals at least in the frequency band in order to form a radio connection to the data transmitter, wherein the data receiver is configured to disable the RF transceiver when there is no active radio connection between the data receiver and the data transmitter; and wherein the RF receiver is configured to monitor the frequency band in order to recognize the modified radio signal from the data transmitter using the bit sequence, wherein the data receiver is configured to enable the RF transceiver responsive to having recognized the modified radio signal of the data transmitter.

According to another embodiment, a method for transmitting a radio signal may have the steps of: modifying a standard-based radio signal in order to obtain a modified radio signal, the amplitude of which, in a frequency band, additionally has a bit sequence; and transmitting the modified radio signal.

Embodiments of the present invention provide a data transmitter for transmitting a radio signal, the data transmitter being configured to modify a standard-based radio signal in order to transmit a modified standard-based radio signal, the amplitude of which, in a frequency band, additionally comprises (or depicts or reproduces) a bit sequence.

The present invention is based on the idea of comprising an additional bit sequence in the amplitude of a standard-based radio signal. The standard-based radio signal here is modified before being transmitted such that the amplitude of the modified standard-based radio signal comprises the additional bit sequence. The modified standard-based radio signal may, for example, be recognized by an energy-saving RF receiver of a data receiver using the bit sequence when the actual standard-based RF transceiver of the data receiver is disabled.

In order to be able to address/wake-up such energy-saving RF receivers, a suitable wake-up pattern (for example an amplitude-modulated signal) has to be emitted.

Embodiments allow emitting the proprietary signal (wake-up signal) using standard radio systems, without having to change them fundamentally. These standard systems are manipulated such that in special functions provided for in the standard, like test signals, advertising channels, but also thresholds tolerated by the transmission standard, the transmission amplitude is influenced such that the desired wake-up pattern is emitted as well.

Thus, embodiments provide the flexibility advantage of modifying existing radio systems (for example by suitable devices, methods and/or computer programs) in order to emulate a radio signal suitable for wake-up. In some embodiments, no hardware intervention is required on the transmitter side and the receiver side.

Further embodiments provide a system comprising a data transmitter and a data receiver. The data transmitter is configured to modify a standard-based radio signal in order to transmit a modified radio signal, the amplitude of which, in a frequency band, additionally comprises a bit sequence. The data receiver comprises an RF transceiver and an RF receiver. The RF transceiver is configured to transmit and receive standard-based radio signals at least in the frequency band, in order to form a radio connection to the data transmitter, wherein the data receiver is configured to disable the RF transceiver when there is no active radio connection between the data receiver and the data transmitter. The RF receiver is configured to monitor the frequency band in order to recognize the modified radio signal from the data transmitter using the bit sequence, the data receiver being configured to enable the RF transceiver responsive to recognizing the modified radio signal of the data transmitter.

Further embodiments provide a method for transmitting a radio signal. The method includes the following steps:
modifying a standard-based radio signal in order to obtain a modified radio signal, the amplitude of which, in a frequency band, additionally comprises a bit sequence; and
transmitting the modified radio signal.

BRIEF DESCRIPTION OF THE DRAWINGS

Embodiments of the present invention will be discussed below in greater detail referring to the appended drawings, in which.

DETAILED DESCRIPTION OF THE INVENTION

Figure 1:
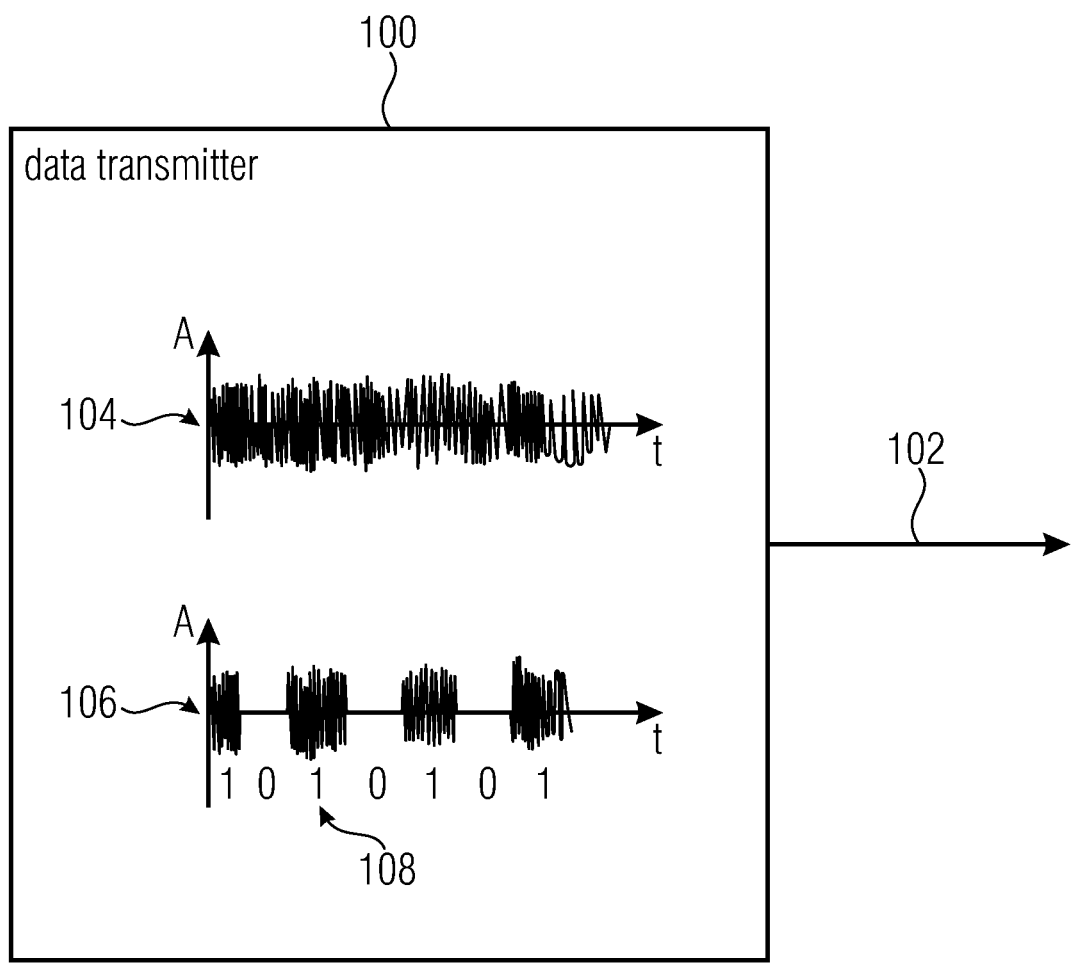
FIG. 1 shows a schematic block circuit diagram of a data transmitter for transmitting a radio signal in accordance with an embodiment of the present invention.

In the following description of embodiments of the invention, equal elements or elements of equal effect in the figures are provided with same reference numerals so that the description thereof in the different embodiments is mutually interchangeable.

FIG. 1 shows a schematic block circuit diagram of a data transmitter 100 for transmitting a radio signal 102 in accordance with an embodiment of the present invention. The data transmitter 100 is configured to modify a standard-based radio signal 104 in order to transmit a modified radio signal (modified standard-based radio signal) 106, the amplitude of which, in a frequency band, additionally comprises a bit sequence 108.

The standard-based radio signal 104 may be a radio signal which corresponds to a radio standard. In other words, the standard-based radio signal 104 may be a radio signal conforming to a standard. This means that the standard-based radio signal 104 is a radio signal which can be received and evaluated (e.g. decoded) by any conventional standard-based data receiver.

In embodiments, the data transmitter 100 may be configured to transmit the standard-based radio signal 104 in a first operating mode (for example normal operating mode or standard-based operating mode), and to modify the standard-based radio signal 104 in a second operating mode (for example connection-forming operating mode) in order to transmit the modified radio signal 106.

Thus, the data transmitter 100 may be configured to transmit (either) the standard-based radio signal 104 or the modified radio signal 106 as radio signal 102.

The data transmitter 100 here may be configured to further generate (or produce or provide) the standard-based radio signal 104 in the second operating mode, but modify same such that the amplitude of the modified standard-based radio signal 106, in a frequency band, additionally comprises a bit sequence 108.

In embodiments, the data transmitter 100 may be configured to modify an amplitude of the standard-based radio signal 104 in order to obtain the modified standard-based radio signal 106, the amplitude of which, in a frequency band, additionally comprises the bit sequence 108. Exemplarily, the data transmitter 100 may be configured to comprise the bit sequence in correspondence with an amplitude modulation, such as, for example, ASK (amplitude shift keying) modulation or OOK modulation (OOK=on-off keying, that is a simple form of amplitude shift keying where the carrier is switched on and off).

The data transmitter 100 may be configured to vary a transmission power of the standard-based radio signal 104 in order to obtain the modified standard-based radio signal 106. The data transmitter 100 may, for example, be configured to transmit the standard-based radio signal 104 at a first transmission power in order to comprise a first logic value of the bit sequence, and to transmit the standard-based radio signal 104 at a second transmission power in order to comprise a second logic value of the bit sequence, the first transmission power differing from the second transmission power.

In addition, the data transmitter 100 may be configured to transmit the standard-based radio signal 104 in bursts in order to obtain the modified standard-based radio signal 106, wherein a time interval in which the standard-based radio signal 104 is transmitted, comprises a first logic value of the bit sequence, wherein a time interval in which the standard-based radio signal 104 is not transmitted or in which transmitting the standard-based radio signal 104 is paused, comprises a second logic value of the bit sequence.

In addition, the data transmitter 100 may be configured to vary a frequency band (or channel) in which the standard-based radio signal 104 is transmitted in order to obtain the modified standard-based radio signal 106. Exemplarily, the data transmitter 100 may be configured to transmit the standard-based radio signal 104 in the frequency band (for example first frequency band or first channel) in order to comprise a first logic value of the bit sequence 108 in the frequency band (for example first frequency band), and to transmit the standard-based radio signal 104 in a further frequency band (for example second frequency band or second channel) in order to comprise a second logic value of the bit sequence in the frequency band (for example first frequency band), wherein the frequency band (for example first frequency band) differs from the further frequency band (for example second frequency band).

The modified standard-based radio signal 106 thus essentially corresponds to the standard-based radio signal 104, however with the difference that, in the amplitude of the modified standard-based radio signal 106, additionally the bit sequence 108 is comprised. The modified standard-based radio signal 106 may thus, apart from information contained in the standard-based radio signal 104 (or standard-based information), contain additional information comprised using the bit sequence 108.

Figure 2:
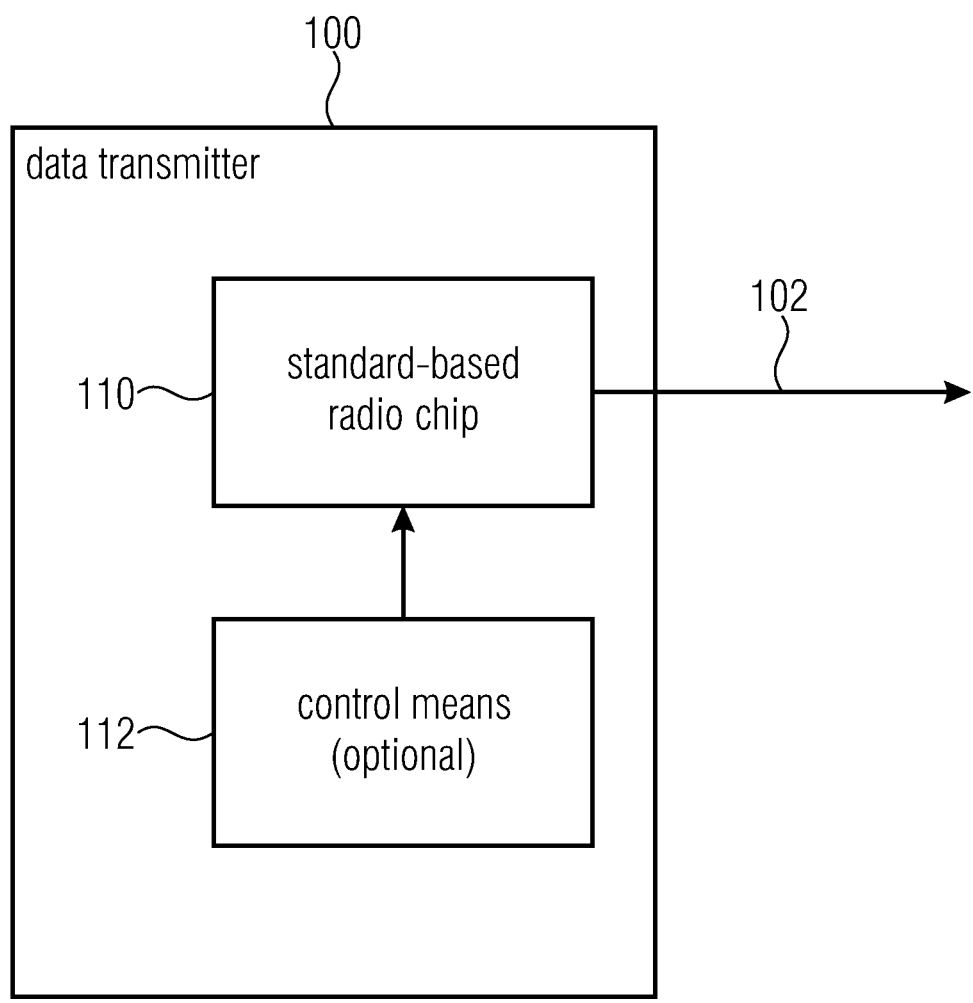
FIG. 2 shows a schematic block circuit diagram of a data transmitter having an RF transmitter and control means in accordance with another embodiment.

FIG. 2 shows a schematic block circuit diagram of a data transmitter 100 in accordance with an embodiment of the present invention. Compared to FIG. 1, the data transmitter 100 shown in FIG. 2 additionally comprises standard-based transmission means 110 and, optionally, control means 112.

Standard-based transmission means 110 may be configured to provide and transmit (in the first operating mode) the standard-based radio signal 106. The standard-based transmission means 110 may, for example, be a standard-based radio chip.

The data transmitter 100 or control means 112 may be configured to drive (in the second operating mode) the standard-based transmission means 110 to modify the standard-based radio signal 104 in order to obtain and transmit the modified radio signal 106, the amplitude of which, in a frequency band, additionally comprises the bit sequence 108.

Alternatively, the data transmitter 100 may additionally comprise a device downstream of the standard-based transmission means 110, like an amplifier or mixer, wherein the data transmitter 100 or the control means 112 may be configured to drive the downstream device to modify the standard-based signal provided by the standard-based transmission means in order to obtain and transmit the modified radio signal 106.

Figure 3:
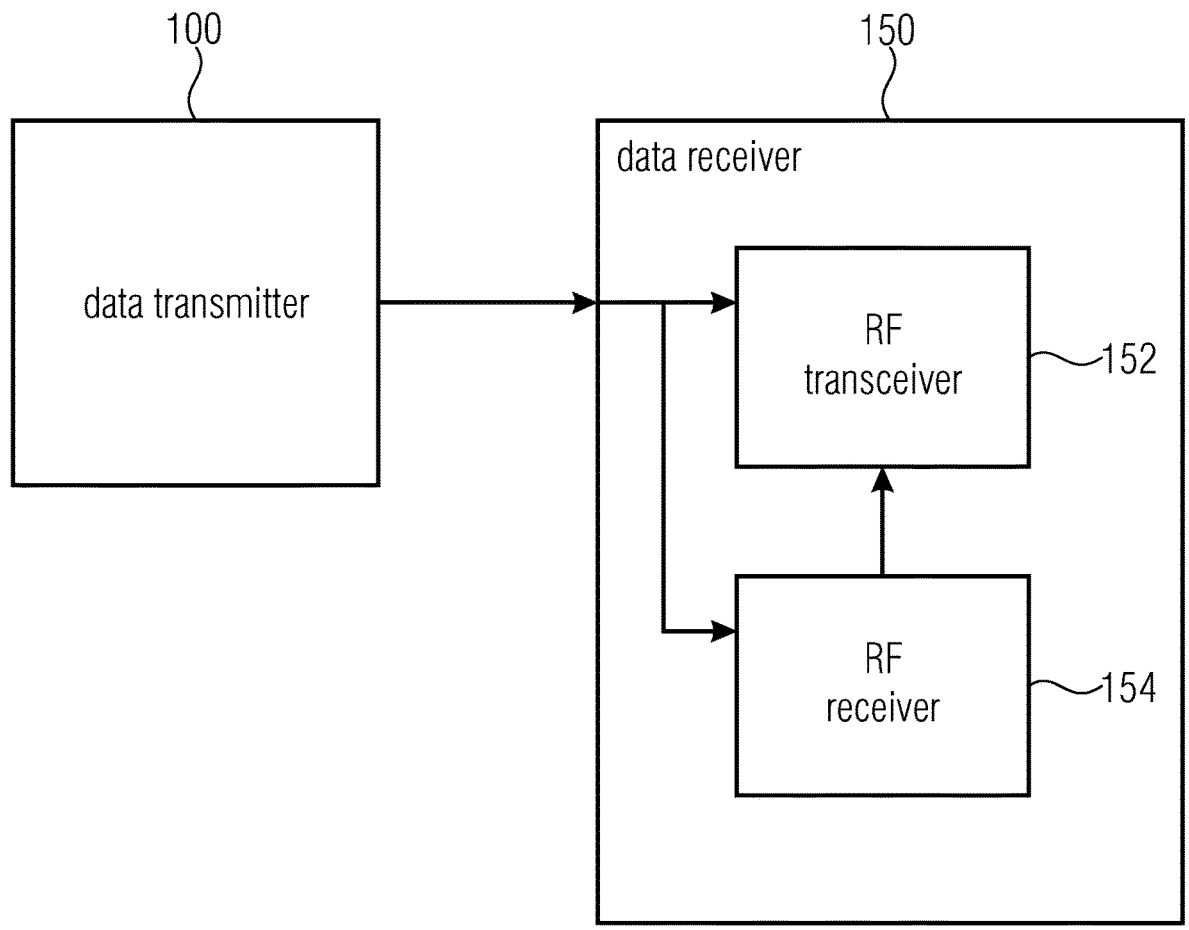
FIG. 3 shows a schematic block circuit diagram of a system having a data transmitter and a data receiver.

FIG. 3 shows a schematic block circuit diagram of a system having a data transmitter 100 and a data receiver 150.

As has already been discussed referring to FIGS. 1 and 2, the data receiver 150 may be configured to modify a standard-based radio signal in order to transmit a modified radio signal, the amplitude of which, in a frequency band, additionally comprises a bit sequence.

The data receiver 150 may comprise a standard-based RF transceiver 152 and an additional RF receiver 154.

The RF transceiver 152 of the data receiver 150 may be configured to transmit and receive standard-based radio signals 104 at least in the frequency band in order to form a radio connection to the data transmitter 100, wherein the data receiver 150 may be configured to disable the RF transceiver 152 when there is no active radio connection between the data receiver 150 and the data transmitter 100. The RE transceiver 152 may, for example, be a (conventional) standard-based radio chip.

The additional RE receiver 154 may be configured to monitor the frequency band in order to recognize the modified radio signal 106 (for example wake-up signal or enabling signal) from the data transmitter 100 using the bit sequence 108, wherein the data receiver 150 may be configured to enable the RF transceiver 152 responsive to recognizing the modified radio signal 106 of the data transmitter 100.

Thus, the data receiver 100 may be configured to enable the RF transceiver 152 (only) if the bit sequence fulfils a predetermined criterion. Exemplarily, the predetermined criterion may be a sufficient match between the bit sequence and a predetermined bit sequence or between part of the bit sequence and part of the predetermined bit sequence. In addition, the predetermined criterion may be a match of information which the bit sequence comprises or contains, and predetermined or expected information.

Further embodiments of the data transmitter 100 and the data receiver 150 are described below in greater detail.

As has already been mentioned, the data receiver 150 may comprise an RF transceiver 152 and an additional RF receiver 154, wherein the RF receiver 154 is able to enable, that is wake-up, the RF transceiver 152 responsive to recognizing the modified radio signal 106. The RF receiver 154 will consequently be referred to as wake-up receiver and the modified radio signal 106 as wake-up signal.

The wake-up receiver technology used (of the data receiver 150) thus uses a proprietary non-standardized radio protocol, which is inherently predetermined fixedly. In order to make this technology usable for radio technologies available worldwide, operating pursuant to standards, like Bluetooth, Bluetooth Low Energy, ZigBee (a specification for wireless networks of low data volume) or WLAN (Wireless Local Area Network), these standardized systems employed already have to generate (or emulate) radio signals which are interpreted by the current-saving wake-up receiver technology as a proprietary wake-up signal. Depending on the radio standard, generating emulation signals is difficult since there is not always direct access to the lower OSI layers near the bit transmission layer (or physical layer (PHY layer)).

Thus, a standard-based radio signal 104 is shaped (modified) such that it may be interpreted to be an OOK-modulated wake-up signal (OOK=On-Off-Keying, that is an amplitude modulation of the high-frequency carrier with signal intensities "on" and "off"). The goal is emitting an OOK-modulated bit sequence of a length of 8 bits to 32 bits or—if necessitated—longer sequences for useful data to reproduce the wake-up sequence (for example 31-bit sequence). Typically, the data rates are in the range of 32 bits/second to 64 kbits/second.

The carrier frequency may be in the HF (high frequency), VHF (very high frequency) and UHF (ultra-high frequency) frequency band. The modulation may be executed as an amplitude modulation with a degree of modulation of 100% (in this case "OOK"). However, a low degree of modulation may also be used, at least so low that the OOK "0" level comprises a level distance of, for example, at least 10 dB to the OOK "1" level. The advantage of OOK-modulated carrier signals is detecting and receiving same using current-saving radio receivers 154 (in the easiest case also using detector, sampling or super-regenerative receivers) (remark: the current consumption here frequently is below 20 µA).

A standard-based burst signal may be used as OOK "1". For OOK "0", there may be a short break. The burst represents an HF (high frequency) activity at the carrier which is to take place without any amplitude modulation, like, for example, in FSK (frequency shift keying) or QPSK (quadrature phase-shift keying) or different phase and frequency modulations, see FIG. 4.

Figure 4:
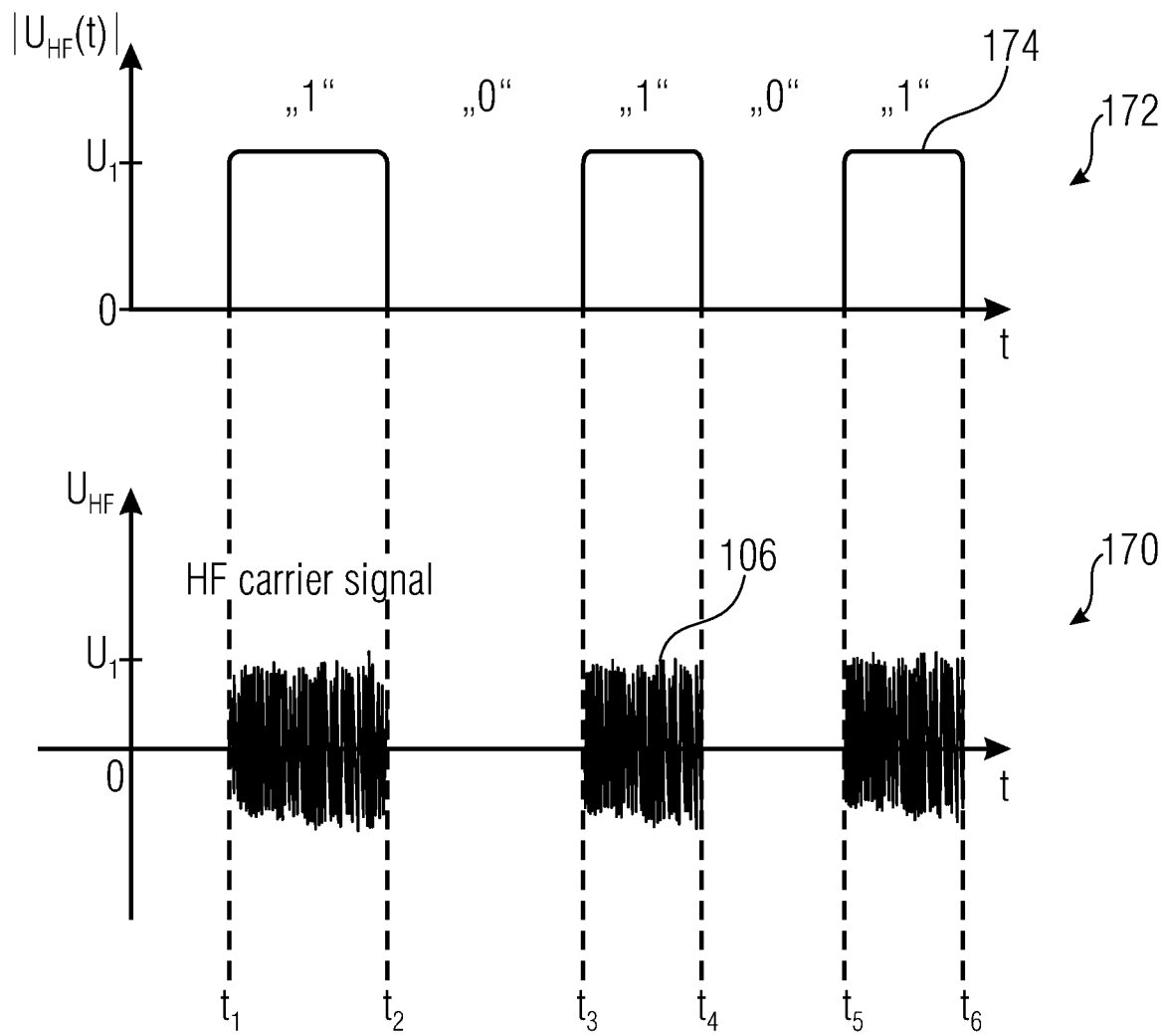
FIG. 4 shows a diagram of a modified radio signal, the amplitude of which, in a frequency band, additionally comprises a bit sequence, and a diagram of an envelope of the modified radio signal, each plotted over time.

In detail, FIG. 4 shows a diagram 170 of a modified radio signal 106, the amplitude of which, in a frequency band, additionally comprises a bit sequence 108, and a diagram 172 of an envelope 174 of the modified radio signal 106, each plotted overtime.

It is favorable for the modulation rate within the burst to be one order of magnitude higher than the desired OOK data rate. More complex modulations, like 16-QAM (quadrature amplitude modulation), for example, are also conceivable. It is essential here that the radio signals may be interpreted by the wake-up receiver 154 as OOK "1" and "0" signals. The burst may also be a radio inquiry (for example inquiry scan) or a radio data package of a certain length. In is important here to keep the activity time as regards the desired OOK bit duration. This method is easy to realize for low OOK data rates (for example bit duration>10 ms) and also be applied in radio standards of difficult access to the bit transmission layer (PHY layer), for example by simply enabling a software procedure which correlates with the corresponding radio activity. One potential implementation may be a very slow OOK modulation when a radio standard function (for example inquiry scan) is triggered or interrupted.

The OOK "0" may also be realized by a change in channel to a different frequency which is in a sufficient distance to the original frequency. Thus, corresponding HF filter bandwidths of, for example, SAW (surface acoustic wave) filters (in the range of a transmission bandwidth of 2 MHz to 10 MHz) may be considered. This method is suitable when higher OOK data rates (for example bit duration <1 ms) are to be achieved. Accessing the channel selection usually entails a certain software-induced delay. Thus, shorter OOK bit durations may be achieved.

Apart from the generation of an ASK or OOK-modulated wake-up signal 106 as described above, the following methods may be used for shaping wake-up telegrams. The wake-up telegram here may be comprised by the bit sequence 108. In other words, the bit sequence 108 may form a wake-up telegram.

Figure 5:
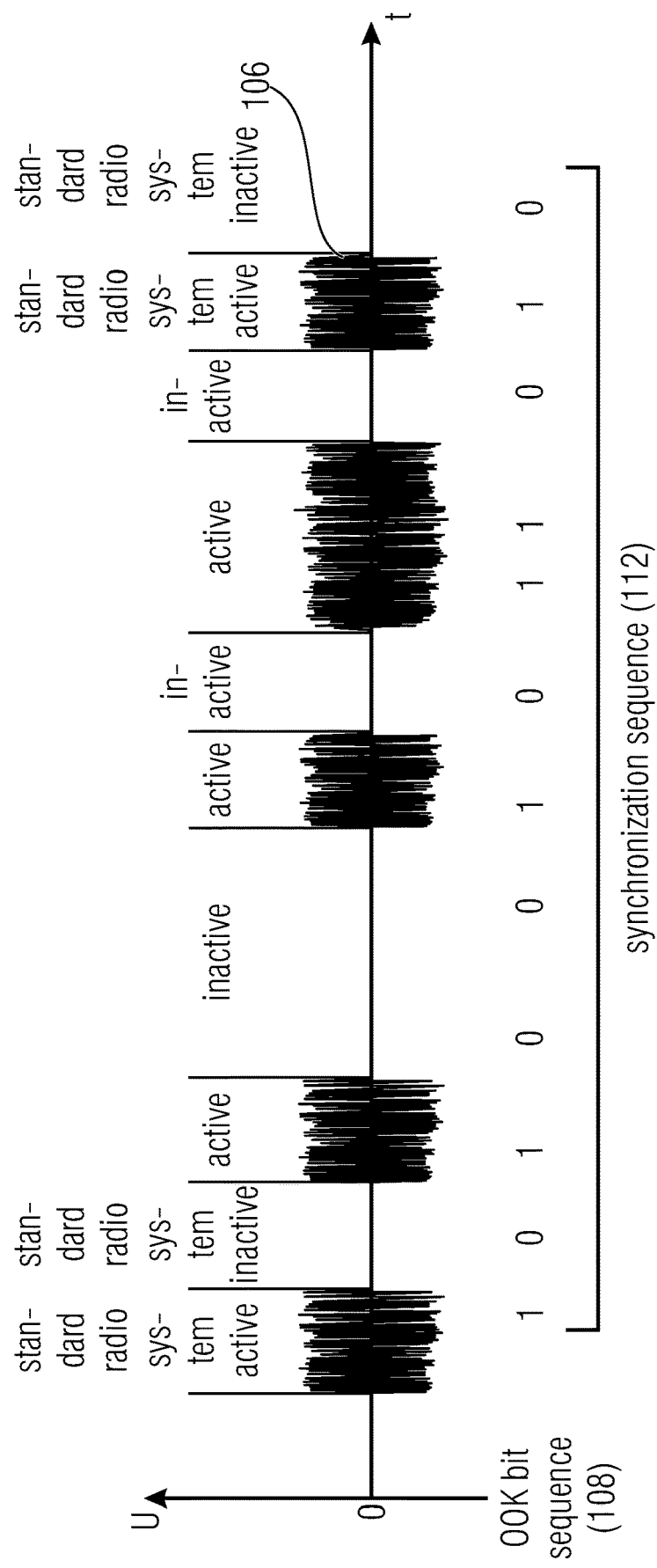
FIG. 5 shows a diagram of a modified radio signal, the amplitude of which, in a frequency band, additionally comprises a bit sequence which forms a telegram containing a synchronization sequence.

FIG. 5 shows a diagram of a wake-up signal 106, the amplitude of which, in a frequency band, additionally comprises a bit sequence 108 which forms a telegram containing a preamble or synchronization sequence 112. The data receiver 150 here may be configured to recognize the wake-up signal 106 using the preamble or synchronization sequence 112. In other words, the wake-up telegram which may be emulated using the methods as described above, may comprise a specially modulated preamble (for example a binary bit sequence having a sharp autocorrelation function) (see FIG. 5). Thus, due to this message, all of the objects may react with a suitable current-saving wake-up receiver 154 and trigger further actions (for example enabling secondary electronics, reply as a radio telegram or optical signaling or acoustic signaling).

Figure 6:
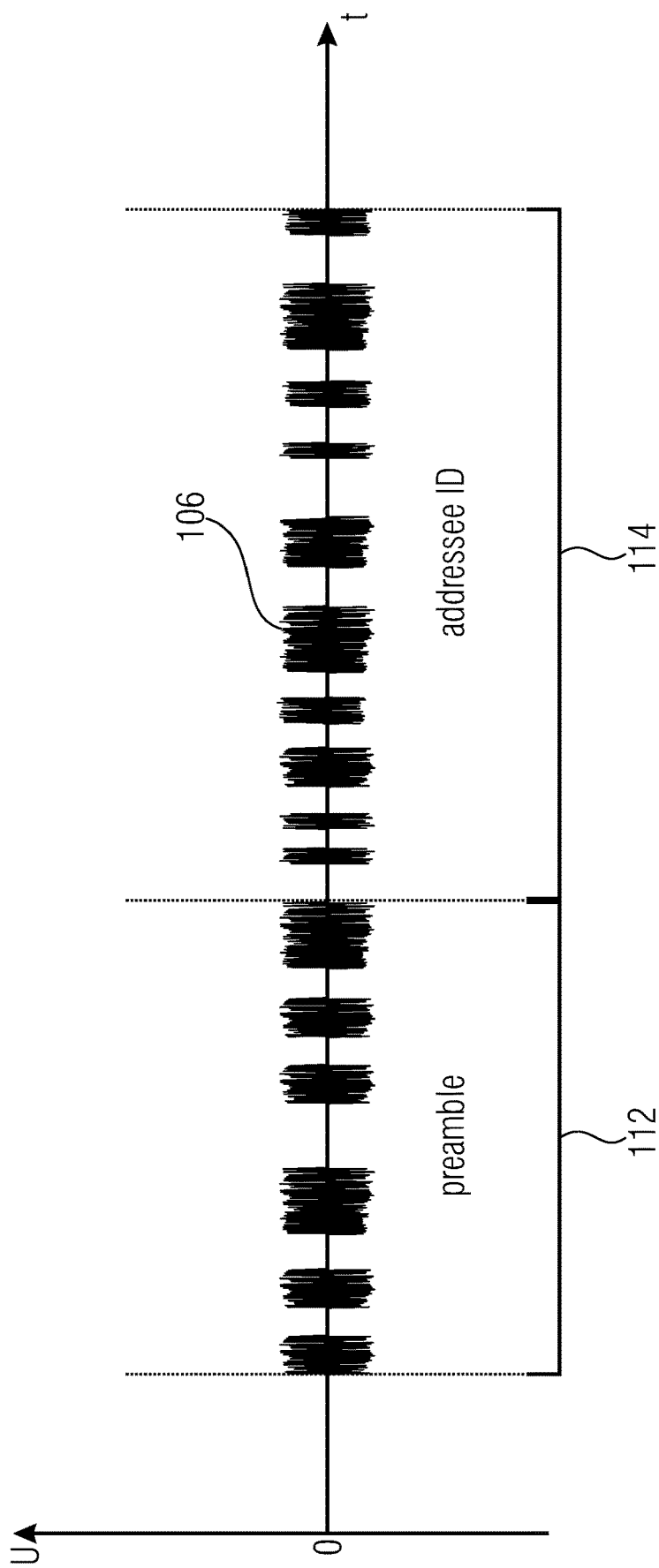
FIG. 6 shows a diagram of a modified radio signal, the amplitude of which, in a frequency band, additionally comprises a bit sequence which forms a telegram containing a synchronization sequence and transmitter identification.

FIG. 6 shows a diagram of a wake-up signal 106, the amplitude of which, in a frequency band, additionally comprises a bit sequence 108 which forms a telegram containing a preamble 112 and a transmitter identification 114. The data receiver 150 here may be configured to enable the RF transceiver 152 (only) if the transmitter identification matches an expected transmitter identification. In other words, the wake-up telegram which may be emulated using the methods as described before, may comprise a specially modulated preamble (for example a binary bit sequence having a sharp autocorrelation function) and a binary sequence which corresponds to the transmitter identification (ID) (see FIG. 6). Thus, all of the current-saving wake-up receivers can receive the broadcast message and, if necessitated, trigger an action in secondary electronics. Case of application: current-saving recognition of, for example, a certain WLAN network of a certain SSID (service set identifier, i.e. a freely selectable name of a service set (that is apparatus in a WLAN)). Recognizing takes place in mobile terminals (cell phone, PDA, smartphone or the like) in a current-saving manner. Only if the SSID broadcasted in the broadcast message matches the SSID expected in the terminal will the radio transceiver (RF transceiver) 152 in the mobile terminal be enabled for WLAN communication and a connection setup be initiated.

Figure 7:
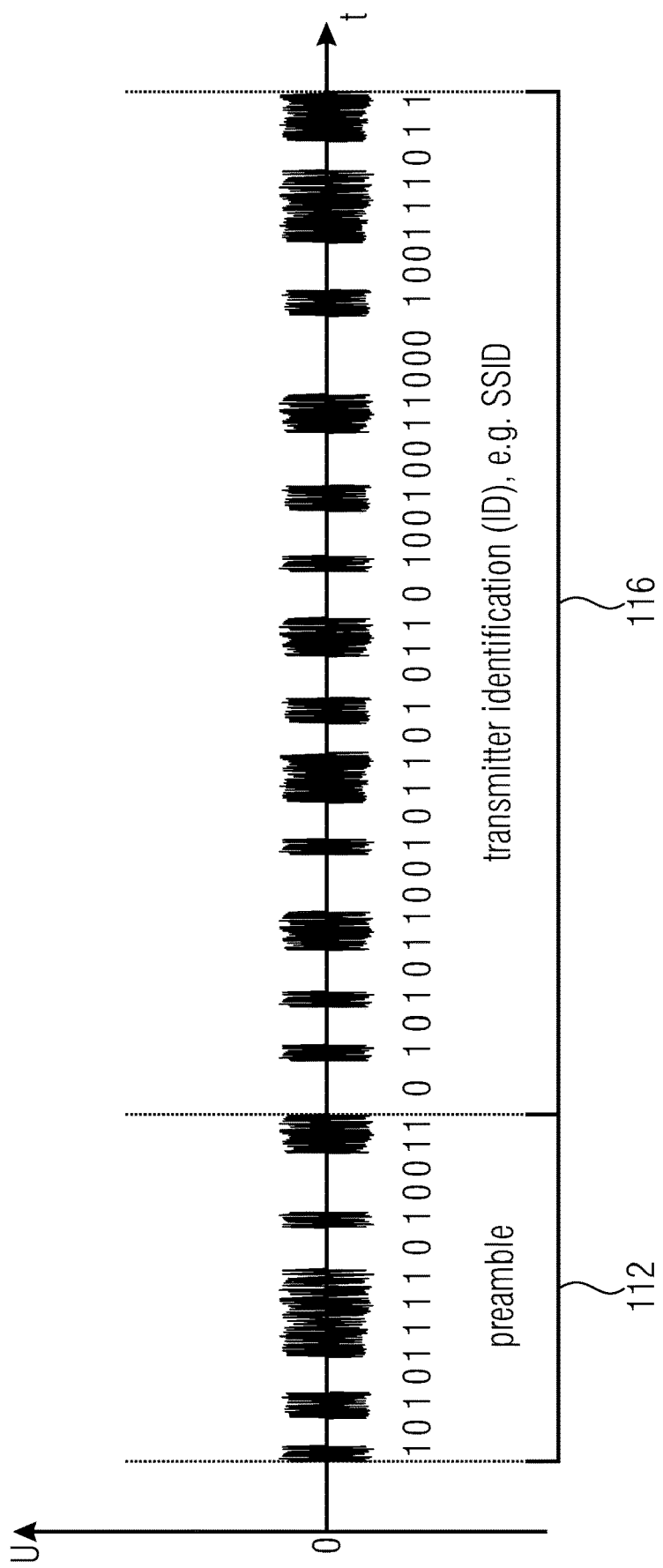
FIG. 7 shows a diagram of a modified radio signal, the amplitude of which, in a frequency band, additionally comprises a bit sequence which forms a telegram containing a synchronization sequence and a receiver identification.

FIG. 7 shows a diagram of a wake-up signal 106, the amplitude of which, in a frequency band, additionally comprises a bit sequence 108 which forms a telegram containing a preamble 112 and a receiver identification 116. The data receiver 150 here may be configured to enable the RF transceiver 152 (only) if the receiver identification 116 matches an expected receiver identification. In other words, the wake-up telegram which may be emulated using the methods as described above may comprise a specially modulated preamble (for example a binary bit sequence having a sharp autocorrelation function) and a receiver identification (RX-ID) for addressing certain objects or object classes (see FIG. 7). Example: on the basis of the emulated modulation (see 3.1), a current-saving wake-up receiver can receive the wake-up telegram including the receiver identification and, if the transmitted identification and the actual identification of the mobile terminal (for example a mobile phone in the GSM (global system for mobile communications) network) match, enable the radio transceiver (and further electronic components necessitated for GSM) and initiate the GSM connection setup.

The methods presented referring to FIGS. 5 to 7 may also be combined correspondingly, if necessitated. The preambles 112 used are different binary sequences which each comprise a sharp autocorrelation function and which, among one another, correlate to the least extent possible (cross-correlated at a low maximum), so that, even with faulty reception, an unambiguous recognition and differentiation at small probabilities of confusion are possible. The current-saving detection of the emulated radio signals is common to all of these methods so that a considerably reduced energy consumption, for example in the mobile terminal, becomes possible. Consequently, longer operating times of battery-operated components, such as, for example, sensors including radio receivers, are possible. In addition to the small energy consumption, a decisive technical advantage is the low reaction time, in particular when compared to previous radio solutions entailing very high reaction times or cycle times of minutes or hours.

Examples of widespread radio systems which are suitable for the methods as described above are:
- HF-RFID at 13.56 MHz=>RFID (radio frequency identification, i.e. identification by means of electromagnetic waves) readers
- UHF-RFID in the range of 868 MHz/915 MHz=>RFID readers
- Bluetooth and Bluetooth Low Energy at 2.4 GHz
- ZigBee at 868 MHz/915 MHz and 2.4 GHz
- Wireless LAN at 2.4 GH and at 5 GHz
- Wireless telephone DECT standard at 1.89 GHz (DECT=digital enhanced coreless telecommunications, that is an international standard for telecommunication by means of radio technology)
- Mobile radio systems GSM/LTE/UMTS and the like at 400 MHz to 3 GHz (LTE=long term evolution, referring to a fourth generation mobile radio standard; UMTS=universal mobile telecommunications system, that is a third generation mobile radio standard)

Further embodiments of the data transmitter 100 and the data receiver 150 will be described below.

The RF receiver or wake-up receiver 154 may react to amplitude-modulated signal patterns. The extremely current-saving receiver may be addressed by the corresponding signal and serves for enabling other components.

Thus, the current-saving system includes the data receiver 150 having the wake-up receiver 154, and the data transmitter (wake-up pattern transmitter) 100, without which the system is not functional. In order to make use of the data receiver 150 having the wake-up receiver 154 without any special data transmitter, standard radio systems are used in embodiments to generate such wake-up patterns. There are different ways for doing this. Depending on the standard radio system, there are different degrees of freedom for generating a wake-up pattern.

If the radio system offers a direct way of emitting a wake-up pattern with no hardware intervention, this may be triggered by means of software. Thus, carrier signals or advertising channels may be used which are used by the radio standard, for example when setting up a radio connection.

When directly emitting the amplitude-modulated signal by the radio system is not possible, such a signal may also be emulated by different emissions. It is decisive here for the radio signal to be recognized to be a wake-up pattern by the wake-up receiver. Thus, the input filters of the wake-up receiver may also contribute to emulating a wake-up pattern from a signal received. It may be observed here that frequency-modulated signals, when received by a corresponding frequency-selective reception branch, are similar to an amplitude modulation, without actually performing same. The frequency change of the actual frequency-modulated transmission thus generates amplitude variations which may be interpreted to be amplitude modulations, in the reception branch which has not been optimized for this.

Figure 8:
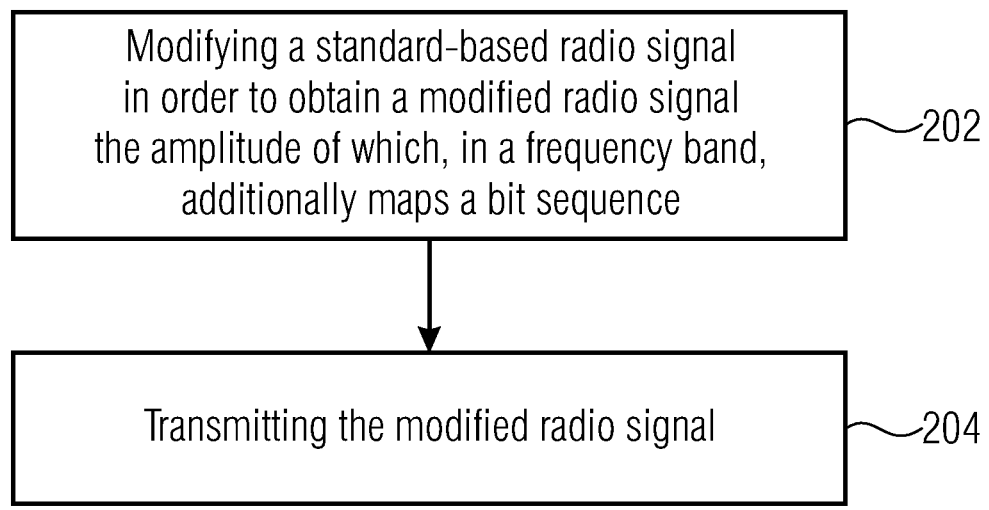
FIG. 8 shows a flow chart of a method for transmitting a radio signal in accordance with an embodiment.

FIG. 8 shows a flowchart of a method 200 for transmitting a radio signal. The method 200 includes a step 202 of modifying a standard-based radio signal in order to obtain a modified radio signal, the amplitude of which, in a frequency band, additionally comprises a bit sequence; and a step 204 of transmitting the modified radio signal.

Although some aspects have been described in the context of an apparatus it is clear that these aspects also represent a description of the corresponding method, such that a block or element of an apparatus also corresponds to a respective method step or a feature of a method step. Analogously, aspects described in the context of or as a method step also represent a description of a corresponding block or detail or feature of a corresponding apparatus. Some or all of the method steps may be executed by (or using) a hardware apparatus, like, for example, a microprocessor, a programmable computer or an electronic circuit. In some embodiments, some or several of the most important method steps may be executed by such an apparatus.

Depending on certain implementation requirements, embodiments of the invention may be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer-readable.

Some embodiments according to the invention include a data carrier comprising electronically readable control signals, which are capable of cooperating with a programmable computer system such that one of the methods described herein is performed.

Generally, embodiments of the present invention can be implemented as a computer program product with a program code, the program code being operative for performing one of the methods when the computer program product runs on a computer.

The program code may, for example, be stored on a machine-readable carrier.

Other embodiments comprise the computer program for performing one of the methods described herein, wherein the computer program is stored on a machine-readable carrier.

In other words, an embodiment of the inventive method is, therefore, a computer program comprising a program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer a computer program for performing at least one of the methods described herein to a receiver. The transmission may be performed electronically or optically. The receiver may, for example, be a computer, a mobile device, a memory device or the like. The apparatus or system may, for example, comprise a file server for transferring the computer program to the receiver.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, in some embodiments, the methods are performed by any hardware apparatus. This may be a universally applicable hardware, such as a computer processor (CPU), or hardware specific for the method, such as an ASIC.

The above described embodiments are merely illustrative for the principles of the present invention. It is understood that modifications and variations of the arrangements and the details described herein will be apparent to others skilled in the art. It is the intent, therefore, that the invention is limited only by the scope of the appended patent claims and not by the specific details presented by way of description and explanation of the embodiments herein.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A system comprising:
a data transmitter for transmitting a radio signal, the data transmitter being configured to modify a standard-based radio signal in order to transmit a modified radio signal, wherein an amplitude of the modified radio signal additionally comprises, in a frequency band, in a time domain, a bit sequence; and
a data receiver, the data receiver comprising an RF transceiver and an additional RF receiver;
wherein the RF transceiver is configured to transmit and receive standard-based radio signals at least in the frequency band in order to form a radio connection to the data transmitter, wherein the data receiver is configured to disable the RF transceiver when there is no active radio connection between the data receiver and the data transmitter; and
wherein the RF receiver is configured to monitor the frequency band in order to recognize the modified radio signal from the data transmitter using the bit sequence, wherein the data receiver is configured to enable the RF transceiver responsive to having recognized the modified radio signal of the data transmitter.

2. The system in accordance with claim 1, the data transmitter being configured to modify the standard-based radio signal in the high-frequency range in order to acquire the modified radio signal.

3. The system in accordance with claim 1, the data transmitter being configured to modify the standard-based radio signal by a modulation of a high-frequency carrier of the radio signal in order to acquire the modified radio signal.

4. The system in accordance with claim 1, the data transmitter being configured to modify an amplitude of the standard-based radio signal in order to transmit the modified radio signal.

5. The system in accordance with claim 1, the data transmitter being configured to comprise the bit sequence in correspondence with an amplitude modulation.

6. The system in accordance with claim 1, the data transmitter being configured to comprise the bit sequence in correspondence with an OOK modulation.

7. The system in accordance with claim 1, the data transmitter being configured to transmit the standard-based radio signal at a first transmission power in order to comprise a first logic value of the bit sequence;
the data transmitter being configured to transmit the standard-based radio signal at a second transmission power in order to comprise a second logic value of the bit sequence;
wherein the first transmission power differs from the second transmission power.

8. The system in accordance with claim 1, wherein data transmitter being configured to transmit the standard-based radio signal in bursts;
wherein a time interval in which the standard-based radio signal is transmitted, comprises a first logic value of the bit sequence;
wherein a time interval in which the standard-based radio signal is not transmitted or in which transmitting the standard-based radio signal is paused, comprises a second logic value of the bit sequence.

9. The system in accordance with claim 1, the data transmitter being configured to transmit the standard-based radio signal in the frequency band in order to comprise a first logic value of the bit sequence in the frequency band;
the data transmitter being configured to transmit the standard-based radio signal in a further frequency band in order to comprise a second logic value of the bit sequence in the frequency band;
wherein the frequency band differs from the further frequency band.

10. The system in accordance with claim 1, the data transmitter comprising:
a radio chip configured to provide or transmit the standard-based radio signal; and
a controller configured to drive the radio chip or a device downstream of the radio chip to modify the standard-based radio signal;
wherein the controller is implemented by mean of a microprocessor, field programmable gate array, a programmable computer or an electronic circuit.

11. The system in accordance with claim 1, the data transmitter being configured to transmit, in a first operating mode, the standard-based radio signal; and
the data transmitter being configured to modify, in a second operating mode, the standard-based radio signal in order to transmit the modified radio signal.

12. The system in accordance with claim 11, the data transmitter being configured to further generate the standard-based radio signal in the second operating mode and modify same such that the modified radio signal, apart from information comprised in the standard-based radio signal, comprises additional information comprised using the bit sequence.

13. The system in accordance with claim 1, wherein the standard-based radio signal is a WLAN, DECT, Bluetooth or ZigBee signal.

14. The system in accordance with claim 1, the data transmitter being configured to transmit a telegram to a data receiver, the bit sequence forming the telegram.

15. The system in accordance with claim 14, wherein the telegram comprises a preamble or synchronization sequence.

16. The system in accordance with claim 14, wherein the telegram comprises a transmitter identification of the data transmitter.

17. The system in accordance with claim 14, wherein the telegram comprises a receiver identification of the data receiver.

18. The system in accordance with claim 1, wherein the data receiver is configured to enable the RF transceiver if the bit sequence fulfills a predetermined criterion.

19. The system in accordance with claim 1, comprising a data transmitter, wherein a telegram comprises a preamble or synchronization sequence, wherein the data receiver is configured to recognize the modified radio signal using the preamble or synchronization sequence.

20. The system in accordance with claim 1, comprising a data transmitter, wherein a telegram comprises a transmitter identification of the data transmitter, wherein the data receiver is configured to enable the RF transceiver if the transmitter identification matches an expected transmitter identification.

21. The system in accordance with claim 1, comprising a data transmitter, wherein a telegram comprises a receiver identification of the data receiver, wherein the data receiver is configured to enable the RF transceiver if the receiver identification matches an expected receiver identification.

22. A data receiver, the data receiver comprising an RF transceiver and an additional RF receiver;
wherein the RF transceiver is configured to transmit and receive standard-based radio signals at least in a frequency band in order to form a radio connection to a data transmitter, wherein the data receiver is configured to disable the RF transceiver when there is no active radio connection between the data receiver and the data transmitter; and
wherein the RF receiver is configured to monitor a frequency band in order to recognize a modified radio signal from a transmitter using a bit sequence, wherein the modified radio signal is a standard-based radio signal that is modified such that an amplitude of the modified radio signal, in the frequency band, additionally comprises the bit sequence,
wherein the data receiver is configured to enable the RF transceiver responsive to having recognized the modified radio signal of the data transmitter.

* * * * *